United States Patent [19]
Ogawa et al.

[11] Patent Number: 5,850,645
[45] Date of Patent: Dec. 22, 1998

[54] MULTI-LAYER SEAT HAVING DIFFERENT HARDNESS AND METHOD FOR MANUFACTURING THE SAME

[76] Inventors: Taro Ogawa, 8-52, Kojima Ajinokami 1-chome, Kurashiki-City, Okayama Perfecture 711; Fumio Goto, 829-4 Kushida, Kurashiki-City Okayama Prefecture 710-01, both of Japan

[21] Appl. No.: 817,455
[22] PCT Filed: Jun. 28, 1996
[86] PCT No.: PCT/JP96/01802
§ 371 Date: Mar. 21, 1997
§ 102(e) Date: Mar. 21, 1997
[87] PCT Pub. No.: WO97/03918
PCT Pub. Date: Feb. 6, 1997

[30] Foreign Application Priority Data

Jul. 24, 1995 [JP] Japan ................................. 7-207334

[51] Int. Cl.⁶ ......................................... B68G 7/00
[52] U.S. Cl. ...................... 5/653; 5/922; 297/452.27; 297/452.61; 297/DIG. 6; 264/46.4; 29/91.1; 156/78
[58] Field of Search .................. 5/653, 655.9, 922; 297/452.27, 452.37, 452.61, DIG. 6; 264/46.4, 46.6, 46.5; 156/78; 29/91, 91.1

[56] References Cited

U.S. PATENT DOCUMENTS

| | | | |
|---|---|---|---|
| 4,190,697 | 2/1980 | Ahrens | 5/653 |
| 4,755,411 | 7/1988 | Wing et al. | 5/655.9 |
| 4,837,881 | 6/1989 | Kondo et al. | 5/653 |
| 5,000,515 | 3/1991 | Deview | 297/452 |
| 5,105,491 | 4/1992 | Yoshiyuki et al. | 5/655.9 |
| 5,283,918 | 2/1994 | Weingartner et al. | 5/655.7 |

FOREIGN PATENT DOCUMENTS

| | | | |
|---|---|---|---|
| 2615-714-A | 12/1988 | France | 5/655.9 |
| 59184599 | 12/1984 | Japan . | |
| 62-242510 | 10/1987 | Japan . | |
| 672499 | 10/1994 | Japan . | |
| 780169 | 3/1995 | Japan . | |

*Primary Examiner*—Alexander Grosz
*Attorney, Agent, or Firm*—Renner, Kenner, Grieve, Bobak, Taylor & Weber

[57] ABSTRACT

An object of the present invention is to provide a seat wherein a surface material of the seat is not crumpled by sliding the surface material on a cushioning body thereof and while a person can sit comfortably in the seat, the seat has adequate hardness such that the weight of the person can be supported. A seat (1) comprises a surface material (2) and a cushioning body (6, 12) covered with the surface material. The cushioning body has a shape corresponding to an outline of the seat and is structured of a first cushioning body (6) as an upper layer and a second cushioning body (12) as a lower layer. The first cushioning body is intergral with at least a part of a back surface of the surface material and is connected with the second cushioning body. The first cushioning body has a contact surface (10) corresponding to the shape of a contact surface (13) of the second cushioning body. The first and second cushioning bodies have fasteners (11a, 11b, 14a, 14b), respectively. Those fasteners are intergral with the first and second cushioning body, respectively, and the first cushioning body and the second cushioning body are connected by those fasteners.

25 Claims, 7 Drawing Sheets ial of the
MULTI-LAYER SEAT HAVING DIFFERENT HARDNESS AND METHOD FOR MANUFACTURING THE SAME

FIELD OF INVENTION

The present invention relates to a seat such as a seat for an automobile, a forklift truck, a tractor and the like or a chair used in an office and the like. In particular, the present invention relates to a seat wherein a surface material of the seat is integral with a cushioning body thereof.

BACKGROUND OF THE ART

FIG. 9 shows a surface material 41 of a conventional seat of an automobile and a cushioning body 47 thereof. The surface material 41 comprises a main portion 44 of the seat, side portions 42 thereof and a circumferential portion 43 around the main portion 44, and those portions are cut from a flat material, respectively. The side portions 42 and the circumferential portion 43 are stitched together and the circumferential portion 43 and the main portion 44 are stitched together. The surface material 41 is formed to a shape corresponding to a surface of the seat having a three-dimensional shape.

Then, the cushioning body 47 has the same shape as the shape of the surface material and is covered with the surface material. A wire 48 is provided in the cushioning body 47 and a wire 46 is provided in a cloth 45 stitched between the main portion 44 and the circumferential portion 43, and the seat is structured by connecting the wire 48 and the wire 46 through hog rings so that the surface material cannot be displaced above the cushioning body.

It takes a long time to cut into each piece of the surface material as mentioned above. Recently, the shape of seats has become complicated. Thus, in order to structure a seat having such a complicated shape, a sheet material for the surface material must be cut in pieces having several shapes. Also, when the surface material 41 is connected to the cushioning body 47 through hog rings, this causes an overload of work for workers in an assembly work shop carrying out a mass production in continuous assembly line therefor.

When a person sits on the seat mentioned above, the surface material is expanded and tensioned by the weight of the person. A fiber material used for the surface material is not typically sufficiently elastic that the seat cannot be restored to an original state thereof when the weight of the person is released from the seat. As a result, the surface material is crumpled, and this causes a problem in that the appearance of the seat is worse.

In order to address this problem, as shown in FIG. 9, a surface of a flat material 49 made of a polyurethane foam is adhered on a back surface of the surface material and a thin fiber material 50 such as nylon half or a nonwoven fabric is adhered on another surface of the base material 49 to enhance the elasticity of the surface material.

However, it takes a long time to make such a surface material and the cost thereof becomes expensive.

In addition, a seat such as a seat for an automobile or a chair used in an office or for furniture (hereafter simply cased "a seat") is required to be elastic to sit comfortably and is also required to have an adequate hardness to support the weight of a person who sits thereon.

It is desirable that a circumferential part around the main portion of the seat should be hard to improve maintenance of the shape of the seat, to improve the appearance of the seat and to improve the feel to a person who sits on the seat.

However, it is difficult to control locally and easily the hardness of the seat by the structure and the manufacturing process of the aforementioned seat in the art.

Therefore, an object of the present invention is to provide a seat and a method for manufacturing the seat wherein a surface material of the seat is integrated with a cushioning body thereof.

Another object of the present invention is to provide a seat having integrated layers and a method for manufacturing the seat wherein a lower layer is harder than an upper layer, the upper layer being in contact with a person, the lower layer supporting the weight of the person.

Another object of the present invention is to provide a seat having integrated layers and a method for manufacturing the seat wherein the hardness of the upper layer is locally different.

Still another object of the present invention is to provide a seat and a method for manufacturing the seat wherein the structure of the surface material thereof is simplified and the surface material can be easily assembled or connected to a cushioning body of the seat.

SUMMARY OF INVENTION

A seat of the present invention is structured of a surface material and a cushioning body covered with the surface material. The cushioning body has a shape corresponding to an outline of the seat and is structured of a first cushioning body as an upper layer and a second cushioning body as a lower layer connected to and positioned under the first cushioning body. The first cushioning body is integrated with at least a part of a back surface of the surface material.

The first cushioning body has a contact surface having a shape corresponding to a shape of a contact surface of the second cushioning body. Fastener means for connecting or engaging those cushioning bodies together with each other are provided in the first and the second cushion bodies in contact with each other. The first and the second cushion bodies are connected through the fastener means provided on the contacting surfaces thereof.

When a foamable mixture solution for forming the first cushioning body is still in a state of flow but the gas reaction thereof has been completed, a pressure molding is carried out, and as a result, the first cushioning body is integrated with the surface material.

The pressure molding is carried out by changing the compressibility locally when the foamable mixture solution is still in a state of flow but the gas reaction thereof has been completed, and the hardness of the first cushioning body can be made locally different thereby.

A method of the present invention for manufacturing a seat wherein the seat is structured of a cushioning body which is integrated with a surface material and having a shape defining an outline of the seat, the cushioning body comprises a first cushioning body and a second cushioning body, the first and second cushioning bodies being connected together with each other, comprising the steps of: putting at least one first fastener for connecting the first cushioning body with the second cushioning body on a surface of a bottom half of a pressure type mold, the pressure type mold being for pressure-molding the first cushioning body, the surface of the bottom half thereof being for defining a first contact surface for connecting the second cushioning body; supplying a foamable mixture solution in said bottom half of the pressure type mold; disposing a surface material between the foamable mixture solution supplied in the bottom half of the pressure type mold and the top half thereof; closing the halves of the pressure type mold when the foamable mixture solution is still in a state of flow but has completed a gas reaction thereof; putting at least one second fastener on a surface of a bottom half of a foaming mold positioned corresponding to the first fastener, the foaming mold being for molding the second cushioning body, the surface of the bottom half thereof having a second contact surface corresponding to the first contact surface; supplying a foamable mixture solution in the bottom half of the foaming mold and then closing said bottom half of the foaming mold by a top half thereof; and engaging the first fastener of the first cushioning body foamed with the second fastener of the second cushioning body foamed.

When the hardness of the first cushioning body is to be locally changed, it is desirable that in the step of closing the halves of the pressure type mold the compressibility is changed locally in the foamable mixture solution when the foamable mixture solution is still in a state of flow but has completed the gas reaction thereof. The compressibility is changed by integrating the foamable mixture solution in the same thickness over the surface of the bottom half of the pressure type mold having a narrower spaced portion between the bottom and the top halves thereof.

It is desirable that the first and the second cushion bodies are made of a reactive foamable resin such as a polyurethane foam or a polyurea foam.

It is desirable that the surface material comprise a main skin sheet portion and side skin sheet portions continuing from the main skin sheet portion. The main skin portion is integrated with the first cushioning body and the second cushioning body is covered with the side skin sheet portions.

The main skin sheet portion may be made integrated with the first cushioning body and then the side skin sheet portions may be stitched to the main skin sheet portion. Alternatively, after the side skin portions may be stitched to the main skin sheet portion, this main skin sheet portion may then be integrated with the first cushioning body.

The hardness of the first cushioning body can be different from the hardness of the second cushioning body.

It is desirable that one of the first fastener and the second fastener is a fiber material having loop-shaped standing piles and the other thereof is hook-shaped threads for engaging the loop-shaped standing piles. It is desirable that a base material of a slab urethane foam is provided on a back surface of the fiber material.

The surface material may be a fiber material of a woven fabric or a knitted fabric, a leather or a synthetic leather, and it is desirable that a base material of a slab urethane foam is provided on a back surface of the fiber material of the surface material.

The seat according to the present invention has the surface material integrated with the first cushioning body, and thus, when the weight of a person sitting on the seat is released, the surface material can be restored to an original state thereof by the elasticity of the first cushioning body.

The surface material is disposed between the top and the bottom halves of the pressure type mold and those halves are closed, and thus, the surface material is made integral with the first cushioning body having an outline of the seat, and it is not necessary to cut and stitch up the surface material so that the surface material corresponds to the outline of the seat.

The hardness of the first cushioning body can be changed locally by closing the top and the bottom halves of the pressure type mold having locally a narrower space between the halves thereof. If the narrower space is formed about a circumferential portion around the main portion of the seat, then the main portion thereof will be softer so that the retention by the seat can be improved, i.e., a person who is sitting on the seat can be held in the seat.

The hardness of the second cushioning body can be selected independent from the first cushioning body, so that the weight of a person who sits on the seat can be supported. In addition, the first cushioning body and the second cushioning body can be connected to each other by engaging the fasteners thereof.

Figure 1A:
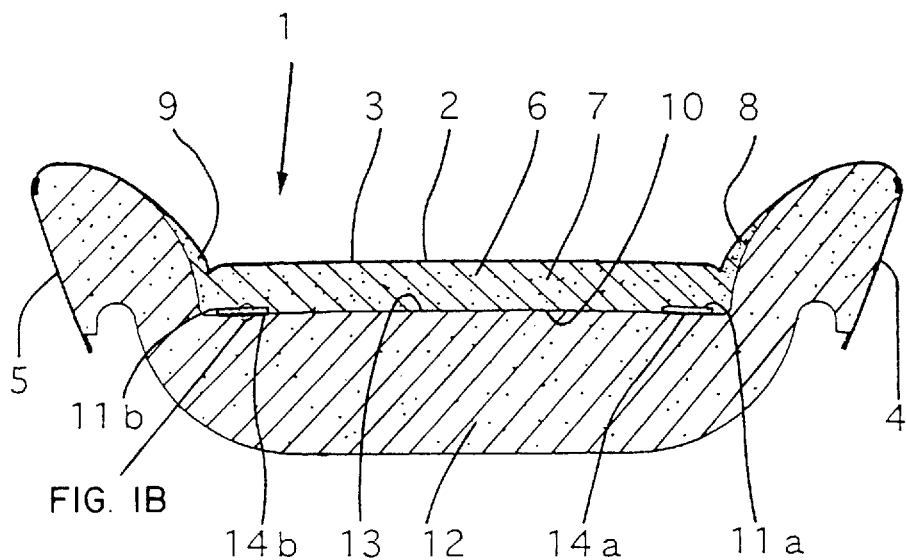
FIG. 1 is a cross sectional view of a seat according to the present invention.

Best Mode for carrying out the Invention

A preferred embodiment of the present invention is described in the following with reference to the appended drawings.

FIG. 1 is a cross sectional view of a seat manufactured in accordance with a method of the present invention. A seat 1 is structured of a surface material 2, a first cushioning body 6 as an upper layer and a second cushioning body 12 as a lower layer integrated under the first cushioning body 6. An outline of the seat is formed by the whole of those structural components.

The surface material 2 comprises a main skin sheet portion 3 and side skin sheet portions 4, 5 continued from the main skin sheet portion 3. The first cushioning body 6 is covered with the main skin sheet portion 3 and the second cushioning body 12 is covered with the side skin sheet portions 4, 5. A back surface of the main skin sheet portion 3 is made integral with the first cushioning body 6, as described in the following.

While in the seat shown in FIG. 1 the main skin sheet portion 3 and the side skin sheet portions 4, 5 are separately or individually made by cutting a sheet material and the portions 3 and 4, 5 are stitched to make the surface material, the three portions may be cut from one sheet material so that those portions can be integral with one another as the surface material.

The surface material 2 used is not limited or specified in any one material. The surface material 2 may be selected from materials which are available for a surface material generally used for a seat such as a fiber material of a woven fabric or a knitted fabric, a synthetic leather, a leather and the like.

The first cushioning body 6 comprises a main portion 7 having a generally uniform thickness and side portions 8, 9 continued from the main portion 7. The thickness of each side portion 8, 9 is gradually thinner. A back surface of the first cushioning body 6 serves as a contact surface 10 for connecting adjustably to the second cushioning body 12 and has first fasteners 11a, 11b for such a connection. The first fasteners 11a, 11b are provided on the contact surface 10 integrally with the first cushioning body 6 by the following manufacturing method.

While a foamed body such as a polyurethane foam is used for the first cushioning body 6, a reactive foamable resin such as a polyurea foam may be used therefor.

While the hardness of the first cushioning body 6 may be constant over the whole of the first cushioning body 6 may be constant over the whole of the first cushioning body 6, it is desirable that the side portions 8, 9 are harder than the main portion 7 in accordance with the following method for manufacturing the first cushioning body 6, in order to achieve higher retention by the seat and to maintain an outline of the seat.

The second cushioning body 12 has a contact surface 13 having a surface shape adjustable to the contact surface 10 of the first cushioning body 6. Also, second fasteners 14a, 14b are provided on the contact surface 13 and are integral with the second cushioning body 12 by the following method for manufacturing. The second fasteners 14a, 14b are positioned to correspond to the first fasteners 11a, 11b so that the second fasteners 14a, 14b can be attached to and detached from the first fasteners 11a, 11b.

Thus, the first cushioning body 6 with the surface material 2 is integrated on the second cushioning body 12 through contact surfaces 10, 13 and fasteners 11a11b and 14a, 14b are engaged with each other, and those bodies are integral with one another thereby. Then, a seat 1 of the present invention is structured by covering the sides of the second cushioning body 12 with the side skin sheet portions 4, 5 of the surface material 2.

Figure 6A:
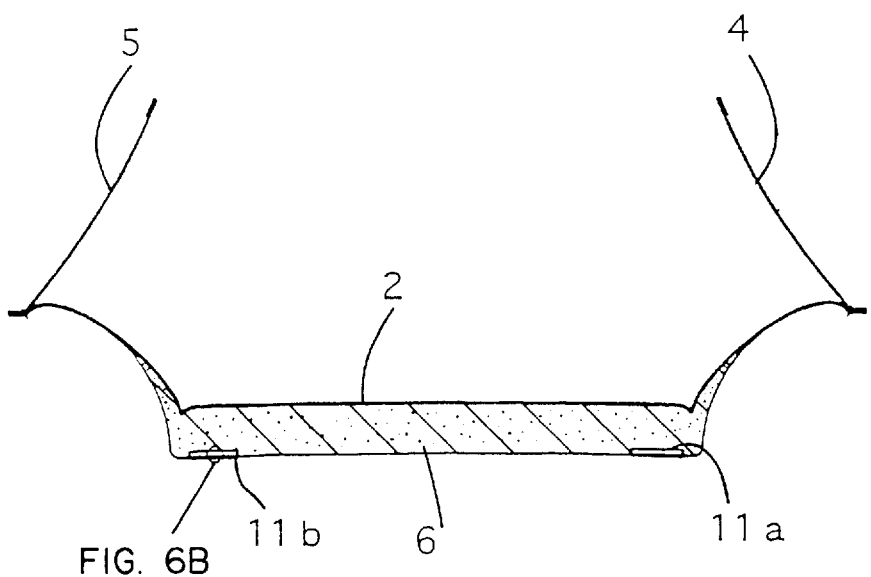
FIG. 6 is a cross sectional view of a first cushioning body of a seat which is intergral with a surface material after molding.
Figure 8A:
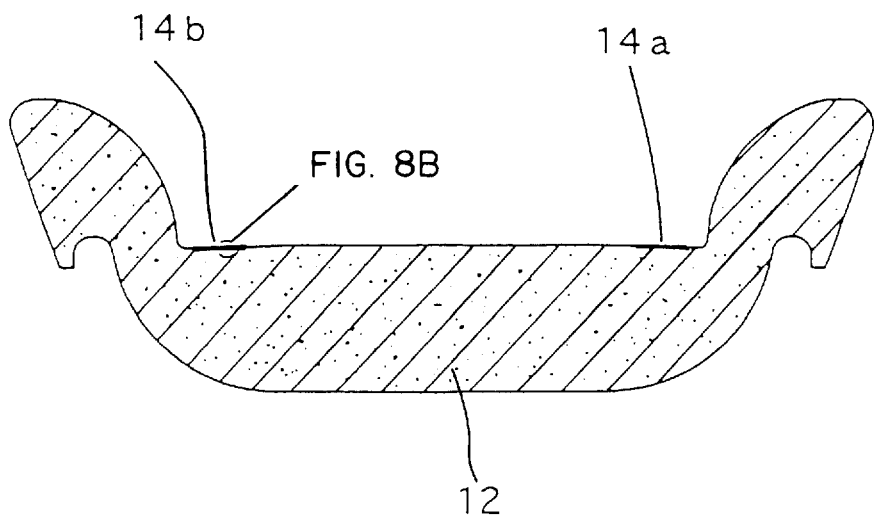
FIG. 8 is a cross sectional view of a second cushioning body of a seat after molding.

The first and the second fasteners can be attached to and detached from each other. For example, one of the first and the second fasteners may be a fiber material having loop-shaped piles and another thereof is mushroom-shaped or L-shaped threads which can engage or hook with the piles (FIG. 6, FIG. 8).

The second cushioning body 12 is a foamed body made of a reactive foamable resin such as a polyurethane foam, a polyurea foam and the like, and this is similar to a foamed body used for the first cushioning body 6.

In the hardness of each cushioning body, it is desirable that the first cushioning body 6 is soft and the second cushioning body 12 is harder than the first cushioning body 6. This is because when the first cushioning body is soft, a person can sit comfortably in the seat, and when the second cushioning body is hard, the weight of a person who sits on the seat can be supported and an outline of the seat can be maintained. If it is required to cushion the seat more, the second cushioning body 12 may be made soft.

We now consider a method for manufacturing the seat and the method of the present invention is described in the following.

Figure 1B:
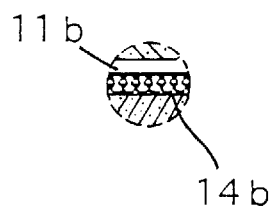
Figure 2:
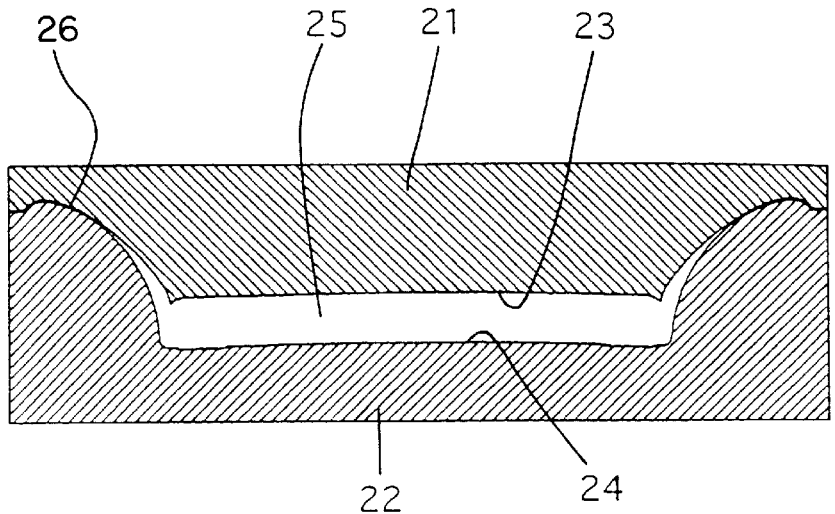
FIG. 2 is a cross sectional view of a pressure type mold having a top half and a bottom half, for manufacturing a first cushioning body in accordance with the present invention.

FIG. 2 shows a pressure type mold comprising a top half 21 and a bottom half 22 thereof for molding the first cushioning body 6 integral with the surface material 2. A pressure surface 23 of the top half 21 has a shape corresponding to an outline along the surface material 2 of the seat shown in FIG. 1. A pressure surface 24 of the bottom half 22 has a shape corresponding to a shape of the contact surface 10 of the first cushioning body 6 to form the contact surface 10 thereof. If the bottom half 22 is closed by the top half 21, then an interior space defined by those halves 21, 22 corresponds to a three-dimensional shape of the first cushioning body 6.

This interior space has such a shape that the thickness of a portion 25 corresponding to the main portion 7 of the first cushioning body 6 can be thicker than the circumferential portion thereof and the thickness of each side portion 26 for side portions 8, 9 continued from the main portion 7 can be gradually thinner.

Figure 3A:
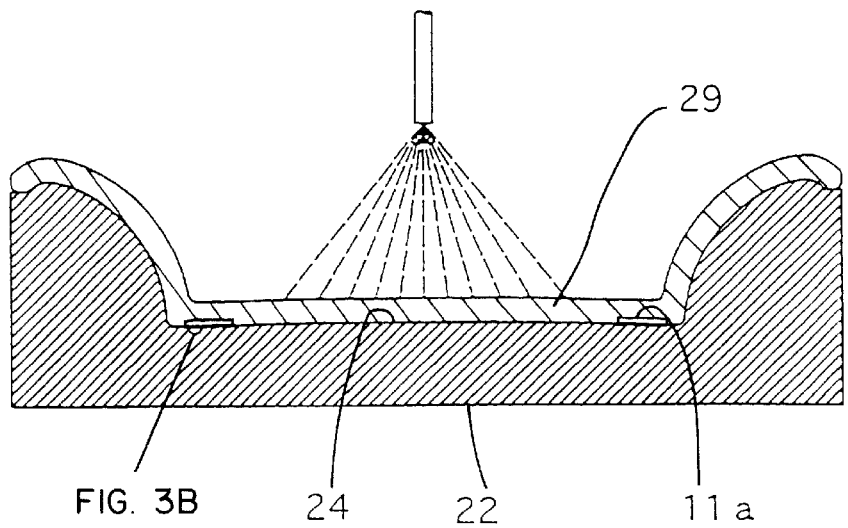
FIG. 3 is a cross sectional view of intergrated layers with a level thickness made of a olyurethane foam sprayed on a bottom half of a mold in accordance with the present invention.

In order to mold the first cushioning body 6 by using this pressure type mold, as shown in FIG. 3, the first fasteners 11a, 11b are put on the pressure surface 24 of the bottom half 22, the surface of each first fastener 11a, 11b being put downward thereon. Then, a foamable mixture solution 29 of a polyurethane foam is integrated thereon by, for example, spraying the solution thereon so that the thickness thereof can be the same over the whole area on the pressure surface.

While in this embodiment two fasteners 11a, 11b are utilized, the number thereof is not limited to two, i.e., the number of the fasteners can be suitably increased or decreased. The surface of each fastener is formed by a fiber material 28 having loop-shaped piles. A back surface thereof is formed by adhering a base material 27 made of a slab urethane foam on a back side of the fiber material and does not contribute to the connection. The base material of a slab urethane foam is used so the foamable mixture solution is not oozed onto the surface of the first fastener during the pressure molding. However, when the pressure molding is carried out so that the solution cannot be oozed thereon, such a base material may not be provided.

The mixture solution made of the reactive foamable resin of a polyurethane foam is used in this embodiment. Alternatively, a mixture solution made of a reactive foamable resin of a polyurea foam may be used.

Figure 4:
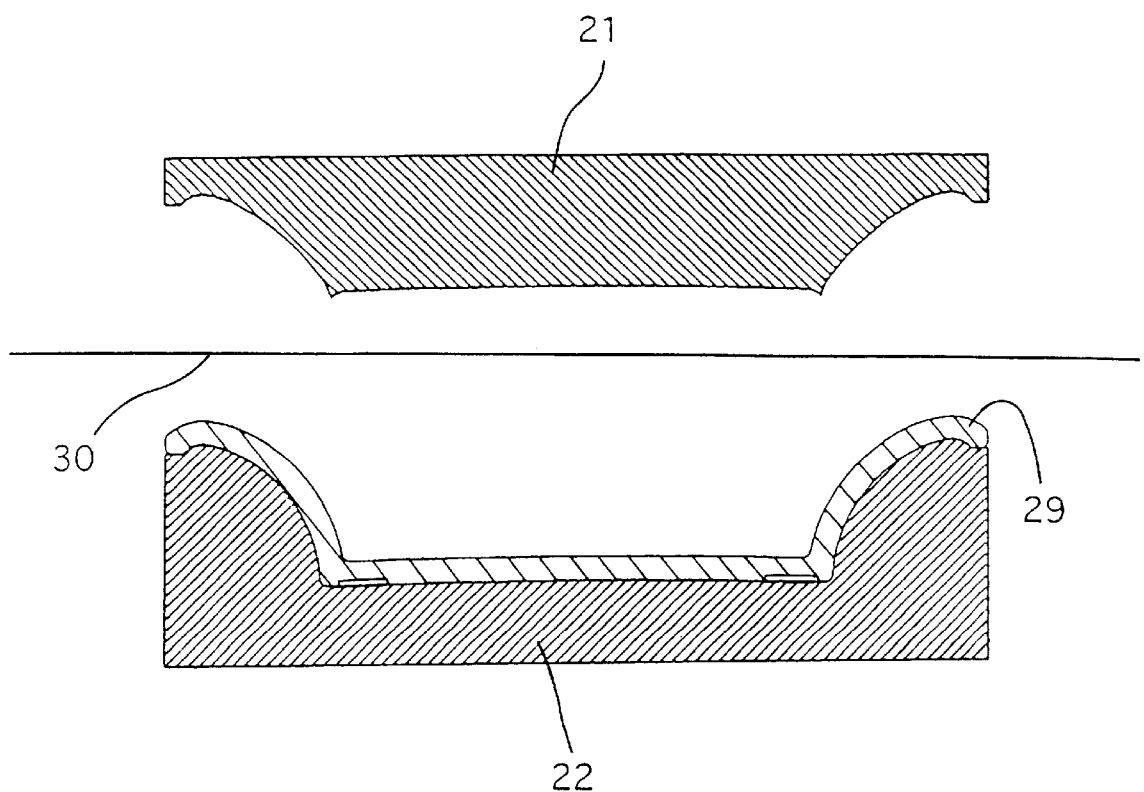
FIG. 4 is a cross sectional view of a top half of a mold and a bottom half of the mold shown in Fig. 3 and showing a surface material positioned therebetween in order to manufacture a first cushioning bod of a seat in accordance with the present invention.
Figure 5:
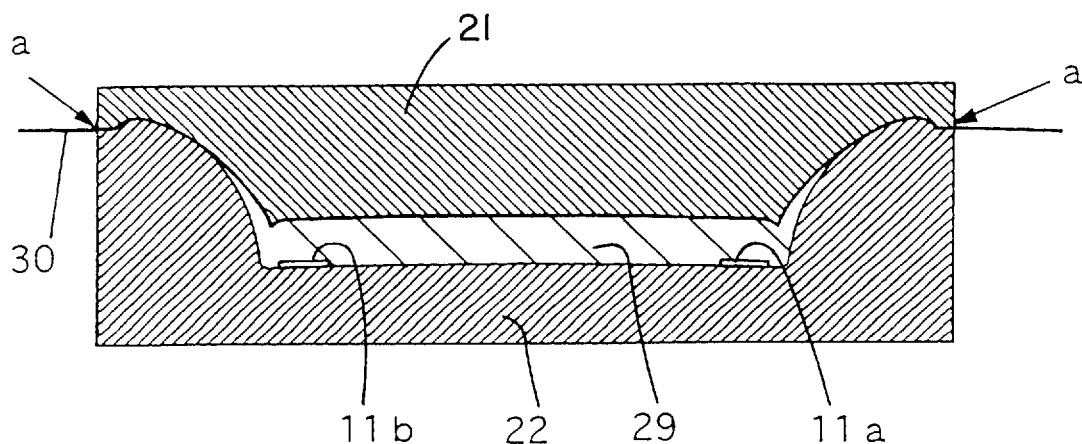
FIG. 5 is a cross sectional view of top and bottom halves of the mold of Fig 4 closed with a surface material disposed therebetween in order to manufacture a first cushioning body of a seat.

In the next step of the method, as shown in Fig. 4, a surface material 30 formed of one material is positioned between the top half 21 of the mold and the foamable mixture solution 29 of a polyurethane foam. When the mixture solution is still in a state of flow but a gas reaction thereof has been completed, the bottom half 22 of the mold is closed by the top half 21 thereof, as shown in FIG. 5.

The foamable mixture solution of the reactive foamable resin such as a polyurethane foam or a polyurea foam is reacted and the molding thereof is then completed. The foamable mixture solution results in a stable foamed body having excellent elasticity so that the resulting foamed body cannot be permanently deformed even though a compressive force is applied to the resulting foamed body.

However, the mixture solution is unstable during the reaction thereof and is still in a state of flow for a certain period of time after completing the gas reaction. Therefore, the deformation thereof can be easily done by applying an external force.

Thus, when the mixture solution in the state of flow is pressurized with a material made of a fiber web and the like, the foamed body is impregnated in part of the tissue structure of the fiber web so that the material can be integrally formed with a surface of the foamed body. In addition, if the compressibility is changed or controlled locally over the foamed body, the foamed body will be harder in a portion compressed by the higher compressibility and will be softer in a portion compressed by the lower compressibility.

Thus, the surface material is fixed on the upper surface of the first cushioning body 6 and the fasteners are fixed on the lower surface thereof by passing the foamable mixture solution into a state of solidity.

In addition, in the interior space formed by the halves 21, 22 of the mold, the interior space is gradually narrower in a space corresponding to the side portion of the seat so that the compressibility of the foamable mixture solution in such location is also higher, and thus, the hardness of the side portions becomes higher. Also, a space corresponding to the main portion of the seat is large and the volume of the space thereof is generally constant so that the hardness of the main portion becomes constant and low.

If the side portions of the seat are to be made soft, a space between the halves 21, 22 of the mold is made the same volume as that of the main portion.

In the next step of the method after completing the pressure molding, a residual portion of the surface material around the first cushioning body 6 is cut. When this is done, a margin for stitching the side skin sheet portions is left (as indicated by "a" in Fig. 5). Then, the side skin sheet portions 4, 5 are stitched on, and the molding of the first cushioning body which is integral with the surface material 2 and the fasteners 11a, 11b is completed (Fig. 6).

In this embodiment, the main skin sheet portion and the side skin sheet portions of the surface material are stitched after completing the pressure molding. Alternatively, the main skin sheet portion and the side skin sheet portions can be stitched before the pressure molding, and then, the pressure molding can be carried out by molding the foamable mixture solution of a polyurethane foam so that the main skin sheet portion can be integral with the first cushioning body as described in the above.

In addition, the surface material is made only of one material but the surface material can also be made of a composite material made by adhering a base material of a slab urethane foam on a back surface thereof. Thus, the base material of a slab urethane foam stops passage of the foamable mixture solution through a fiber material of the surface material during the pressure molding.

Figure 7:
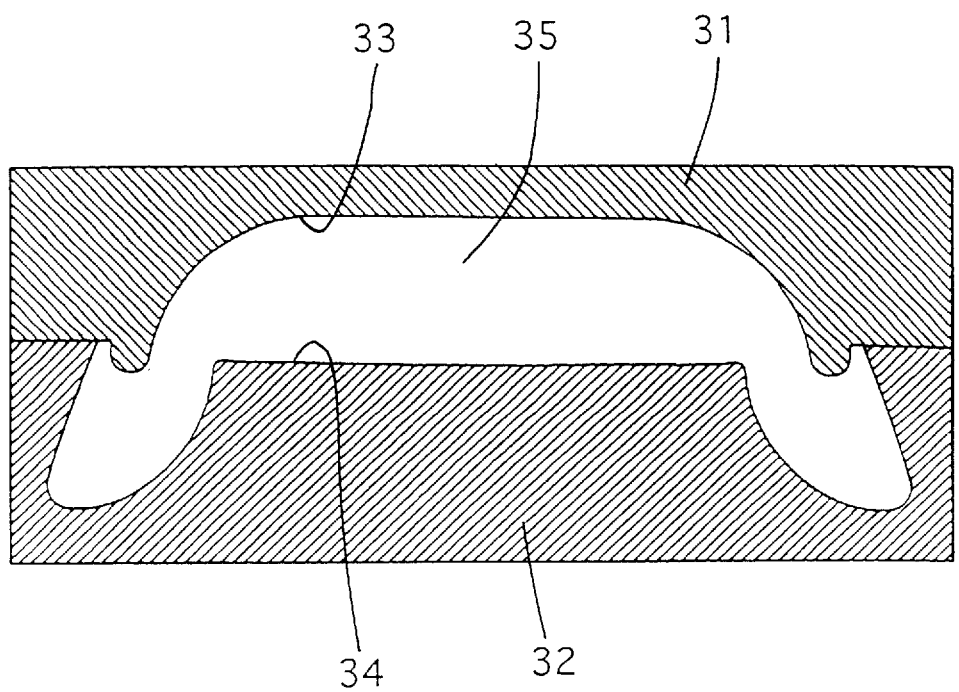
FIG. 7 is a cross sectional view of a foaming mold having a top half and a bottom half for manufacturing a second cushioning bod of a seat in accordance with the present invention.

Fig. 7 shows a foaming mod comprising a top half 31 and a bottom half 32 of the mold for molding the second cushioning body 12. An interior surface 33 of the top half 31 of the mold corresponds to the bottom shape of the second cushioning body 12, and an interior surface 34 of the bottom half 32 of the mold has a shape to form the contact surface 13 which corresponds to the shape of the contact surface 10 of the first cushioning body 6. If the bottom half 32 is closed by the top half 31, an interior space 35 defined in the halves 31, 32 of the mold corresponds to the three-dimensional shape of the second cushioning body 12.

Fasteners 14a, 14b are put on the interior surface 34 of the bottom half 32 of the foaming mold and the positions thereof correspond to the fasteners 11a, 11b of the first cushioning body 6. A surface of each fastener 14a, 14b is faced downward. Then, a foamable mixture solution of a polyurethane foam is supplied therein and the bottom half 32 of the mold is closed by the top half 31. The molding is then carried out. When the molding of the second cushioning body 12 is completed, the fasteners 14a, 14b are fixed on the contact surface 13 thereof integrally therewith, as shown in Fig. 8.

The first cushioning body 6 is integrated on the second cushioning body 12 so that the contact surfaces 10, 13 can be adjusted relative to each other and the fasteners can be engaged or connected. When the side surfaces of the second cushioning body 12 are covered with the side skin sheet portions 4, 5 of the first cushioning body 6, then the seat shown in Fig. 1 is obtained.

In the seat according to the present invention, a surface material thereof is integral with a cushioning body of the seat. The cushioning body is soft and elastic, and thus, the cushioning body makes a person who sits thereon comfortable. While the surface material is expanded by the weight of the person, the surface material is restored to the original state by the elasticity of the cushioning body when such a weight on the seat is released.

When side portions of the seat are harder than the main portion thereof, the retention of the seat can be improved. Also, the shape of the seat can be maintained.

The cushioning body is divided in two bodies so that one body as an upper layer is integrated on another body as a lower layer and the lower layer thereof is not directly in contact with a person who sits on the seat. When the lower layer of the cushioning body is harder than the upper layer thereof, a person can sit on the seat comfortably and his or her weight can be supported. Also, the shape of the seat can be maintained.

The surface material, which directly contacts a person who sits on the seat, is formed of one material so that a step of cutting for preparing several parts or members of the surface material is not necessary. Thus, the process for manufacturing the seat becomes easier so that the cost for manufacturing can be reduced.

The fasteners provided on each layer of the cushioning body can be easily connected by simply contacting each other. In a conventional process for assembling the cushioning body, the surface material is attached to the cushioning body through the hog ring. However, such a conventional process can be simplified and the workload can be reduced.

We claim:

1. A seat comprising a surface material and a first cushioning body and a second cushioning body covered with said surface material, said first cushioning body and said second cushioning body having a shape generally corresponding to an outline of the seat, said first cushioning body as an upper layer being integral with at least a part of said surface material and having a main portion of relatively low compressibility and side portions of outwardly increasing relatively higher local compressibility; and said second cushioning body as a lower layer being connected to and positioned under said first cushioning body, wherein said first cushioning body has a contact surface having a shape corresponding to a shape of a contact surface of said second cushioning body, and fastener means integrally formed in said contact surfaces for connecting said first and said second cushion bodies, so that said first and said second cushioning bodies are connected through said fastener means provided on said contact surfaces thereof.

2. A seat of claim 1, wherein the hardness of said first cushioning body is different from the hardness of said second cushioning body.

3. A seat of claim 1, wherein when a foamable mixture solution for forming said first cushioning body is still in a state of flow but a gas reaction thereof has been completed, a pressure molding is carried out, and said first cushioning body is integral with said surface material thereby.

4. A seat of claim 1, wherein one of said fastener means is a fiber material having loop-shaped standing piles and another of said fastener means thereof has hook-shaped fastener threads which can be engaged with said loop-shaped standing piles.

5. A seat of claim 4, wherein a back surface of said fiber material is formed of a base material made of a slab urethane foam and a surface of said fiber material is formed of said loop-shaped standing piles.

6. A seat of claim 1, wherein said first and said second cushion bodies are made of a reactive foamable resin such as a polyurethane foam or a polyrea foam.

7. A seat of claim 6, wherein a base material made of a polyurethane foam is provided on a back surface of said surface material.

8. A seat of claim 1, wherein said surface material is a fiber material of a woven fabric or a knitted fabric, a leather or a synthetic leather.

9. A seat of claim 1, wherein said surface material comprises a main skin sheet portion and side skin portions continued from said main skin sheet portion, said first cushioning body being integral with said main skin sheet portion, said second cushioning body having sides being covered with said side skin sheet portions.

10. A method for manufacturing a seat wherein said seat is structured of a cushioning body which is integral with a surface material and has a shape defining an outline of said seat, said cushioning body comprising a first cushioning body and a second cushioning body, said first and said second cushion bodies being connected to each other, comprising steps of:

placing at least one first fastener for connecting said first cushioning body with said second cushioning body on a surface of a bottom half of a pressure type mold, said pressure type mold being for pressure-molding said first cushioning body, said surface of said bottom half thereof being for defining a first contact surface for connecting with said second cushioning body;

supplying a foamable mixture solution in said bottom half of said pressure type mold;

disposing a surface material between said foamable mixture solution supplied in said bottom half of said pressure type mold and a top half thereof;

closing both said halves of said pressure type mold when said foamable mixture solution is still in a state of flow but has completed a gas reaction thereof;

placing at least one second fastener on a surface of a bottom half of a foaming mold so that said second fastener can be positioned corresponding to said first fastener, said foaming mold being for molding said second cushioning body, said surface of said bottom half thereof having a second contact surface corresponding to said first contact surface;

supplying a foamable mixture solution in said bottom half of said foaming mold and then closing said bottom half of said foaming mold by a top half thereof;

engaging said first fastener of said first cushioning body and said second fastener of said second cushioning body with each other.

11. A method of claim 10, wherein when the hardness of said first cushioning body is locally changed in said step of closing said pressure type mold by the compressibility being changed locally in said foamable mixture solution when said foamable mixture solution is still in a state of flow but said gas reaction thereof has been completed.

12. A method of claim 11, wherein said compressibility is changed by integrating said foamable mixture solution in the same thickness over said surface of said bottom half of said pressure type mold having a narrow space portion between said bottom and said top halves thereof.

13. A method of claim 10, wherein said surface material comprises a main skin sheet portion and side skin sheet portions continued from said main skin sheet portion, said first cushioning body being integral with said main skin sheet portion, said second cushioning body having sides being covered with said side skin sheet portions.

14. A method of claim 13, wherein said main skin sheet portion is made integral with said first cushioning body and then said main skin sheet portion and said side skin sheet portions are stitched.

15. A method of claim 13, wherein said main skin sheet portion and said side skin sheet portions are stitched and said main skin sheet portion is then made integral with said first cushioning body.

16. A method of claim 10, wherein the hardness of said first cushioning body is different from the hardness of said second cushioning body.

17. A method of claim 10, wherein one of said first fastener and said second fastener is a fiber material having loop-shaped standing piles and another thereof is hook-shaped threads for engaging with said loop-shaped standing piles.

18. A method of claim 17, wherein a back surface of said fiber material is formed of a base material of a slab urethane foam and a surface of said fiber material is formed of said loop-shaped standing piles.

19. A method of claim 10, wherein said first and said second cushion bodies are made of a reactive foamable resin such as a polyurethane foam or a polyurea foam.

20. A method of claim 10, wherein said surface material is a fiber material of a woven fabric or a knitted fabric, a leather or a synthetic leather.

21. A method of claim 20, wherein a base material of a slab urethane foam is provided on a back surface of said fiber material of said surface material.

22. A seat having a cushion covered in part by a surface material comprising, a first cushioning body constituting the upper layer of the cushion and having at least part of the surface material formed integrally therewith, a second cushioning body constituting the lower layer of the cushion, said first cushioning body having a main portion of generally uniform thickness and side portions continuing from said main portion and becoming gradually outwardly thinner and progressively outwardly harder, said main portion of said first cushioning body forming a seating surface and a first contact surface for engaging said second cushioning body, a second contact surface formed on said second cushioning body having a shape substantially corresponding to the shape of said first contact surface, at least one first fastener formed integrally in said first contact surface, and at least one second fastener formed integrally in said second contact surface and positioned for engagement with said first fastener, whereby said first and second cushioning bodies are selectively positioned and connected by joining said first and second fasteners.

23. A seat according to claim 22, wherein said side portions of said first cushioning body are harder than said main portion.

24. A seat according to claim 23, wherein the hardness of said second cushioning body differs from the hardness of said main portion and said side portions of said first cushioning body.

25. A seat according to claim 22, wherein said cushion bodies are made of a reactive foamable resin and said fasteners are made of a fiber material, whereby said fiber material is impregnated with foam forming said cushion bodies.

* * * * *

UNITED STATES PATENT AND TRADEMARK OFFICE
CERTIFICATE OF CORRECTION

PATENT NO. : 5,850,645
DATED : December 22, 1998
INVENTOR(S) : Taro Ogawa and Fumio Goto Page 1 of 1

Figure 3B:
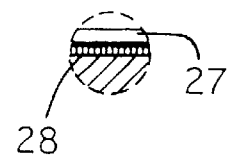
Figure 6B:
Figure 8B:
Figure 9A:
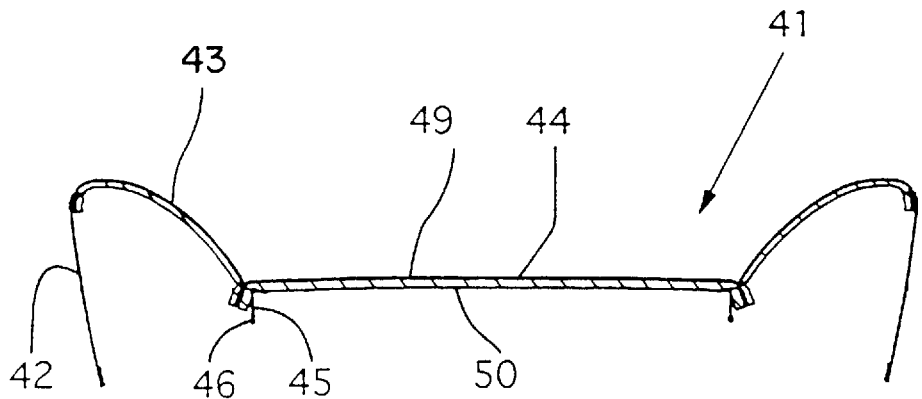
FIG. 9 is a cross sectional view of a surface material of a seat of the prior art and Fig. 9b is a cross sectional view of a cushioning body of the seat of the prior art.
Figure 9B:
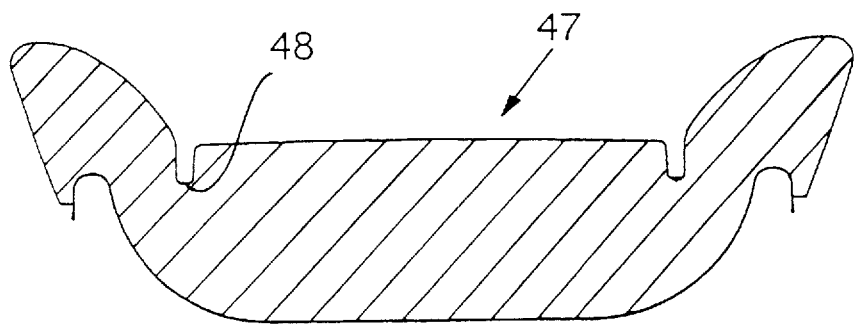

It is certified that error appears in the above-identified patent and that said Letters Patent is hereby corrected as shown below:

<u>Column 6,</u>
Line 16, "FIG. 1" should read -- FIG. 1A --.
Between lines 17 and 18, insert -- FIG. 1B is an enlarged fragmentary sectional view of the portion of Fig 1A indicated as Fig. 1B --.
Line 21, "FIG. 3" should read -- FIG. 3A --.
Between lines 24 and 25, insert -- FIG. 3B is an enlarged fragmentary sectional view of the portion of Fig. 3A indicated as Fig. 3B --.
Line 34, "FIG. 6" should read -- FIG. 6A --.
Between lines 36 and 37, insert -- FIG. 6B is an enlarged fragmentary sectional view of the portion of Fig. 6A indicated as Fig. 6B --.
Line 41, "FIG. 8" should read -- FIG. 8A --.
Between lines 42 and 43, insert -- FIG. 8B is an enlarged fragmentary sectional view of the portion of Fig. 8A indicated as Fig. 8B --.

Signed and Sealed this

Eleventh Day of December, 2001

*Attest:*

*Attesting Officer*

NICHOLAS P. GODICI
*Acting Director of the United States Patent and Trademark Office*